United States Patent [19]
Stone

[11] 3,789,610
[45] Feb. 5, 1974

[54] TANDEM SOLID-HYBRID ROCKET MOTOR

[75] Inventor: William C. Stone, Huntsville, Ala.

[73] Assignee: The United States of America, as represented by the Secretary of the Army, Washington, D.C.

[22] Filed: June 21, 1967

[21] Appl. No.: 649,420

[52] U.S. Cl. .................................. 60/245, 60/251
[51] Int. Cl. ............................................. F02k 3/00
[58] Field of Search ..... 60/207, 220, 224, 225, 250, 60/251, 245

[56] References Cited
UNITED STATES PATENTS

| | | | |
|---|---|---|---|
| 2,711,630 | 6/1955 | Lehman | 60/250 |
| 3,115,008 | 12/1963 | Cohen et al. | 60/245 |
| 3,040,517 | 6/1962 | Ryden et al. | 60/225 |
| 3,128,599 | 4/1964 | Carr | 60/251 |
| 3,136,119 | 6/1964 | Avery | 60/251 |

*Primary Examiner*—Samuel Feinberg
*Attorney, Agent, or Firm*—Edward J. Kelly; Herbert Berl

[57] ABSTRACT

A single-chamber rocket motor containing both a hybrid fuel charge (with associated oxidizer) and a solid propellant charge. Termination of the hybrid motor at the time desired provides accurate missile range zoning. The hybrid fuel charge is in tandem with and forward of the solid propellant charge which provides the minimum impulse of the rocket motor and the minimum missile range. The volume vacated by the solid propellant charge serves as a mixing chamber for more efficient hybrid fuel charge combustion. A gas mixer baffle plate separates the two charges and provides additional mixing.

9 Claims, 4 Drawing Figures

PATENTED FEB 5 1974 3,789,610
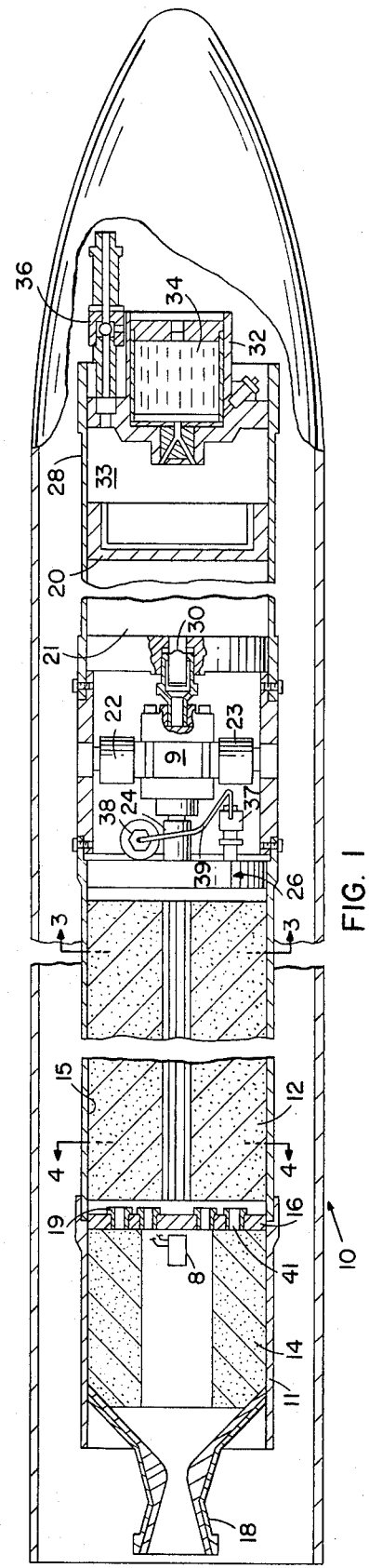
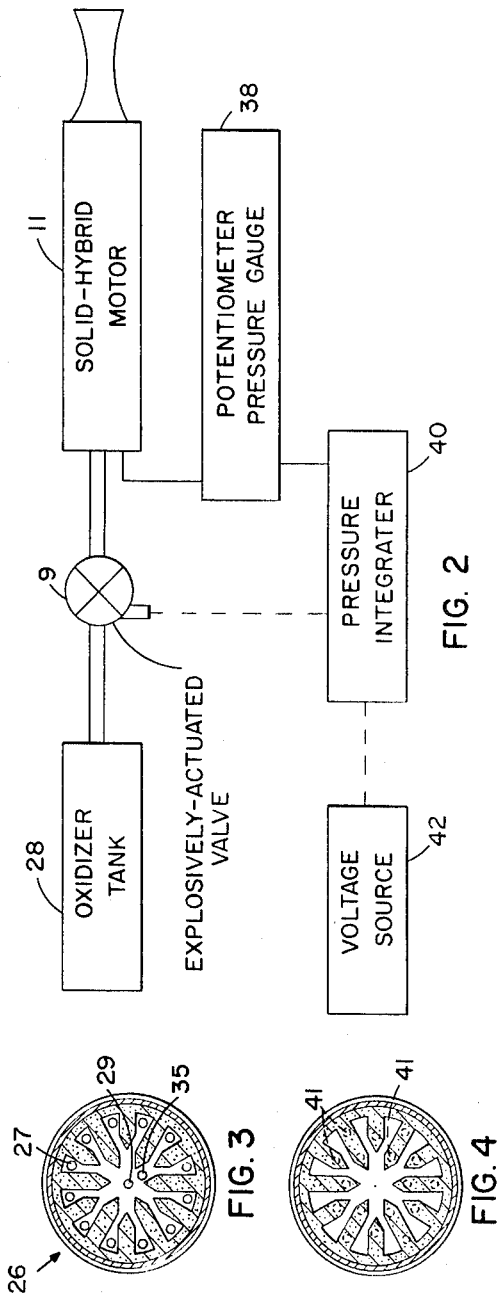
William C. Stone,
INVENTOR.
BY Harry M. Saragovitz
Edward J. Kelly
Herbert Berl
Elihu L. Turetsky

TANDEM SOLID-HYBRID ROCKET MOTOR

BACKGROUND OF THE INVENTION

This invention relates to a novel apparatus for missile range zoning for use in small missiles, and in particular to such an apparatus for use in artillery rockets.

Range zoning for artillery rockets using solid propellant rocket motors has been obtained in the past by variations in firing elevation and/or motor thrust termination. However, the high-altitude flights necessary for short ranges induce wind drift errors, while severe thrust peaks usually result when solid propellant motors are terminated. Accordingly, an apparatus for motor thrust termination which can be employed at any desired time and which has a smooth thrust decay has long been sought after.

Accordingly, it is the principal object of this invention to provide an apparatus for motor thrust termination for use in small missiles such as rockets which can be employed at any desired time and which has a smooth thrust decay.

It is a particular object of this invention to provide such an apparatus for use in field artillery rockets.

SUMMARY OF THE INVENTION

This invention employs a single-chamber rocket motor containing both a hybrid fuel charge (with associated oxidizer) and a solid propellant charge. Termination of the hybrid motor is employed to provide accurate missile zoning. The hybrid fuel charge is in tandem with and forward of the solid propellant charge which provides the minimum impulse of the rocket and a minimum missile range. The volume vacated by the solid propellant charge serves as a mixing chamber for more efficient hybrid fuel charge combustion. A baffle plate separates the two charges and provides additional mixing.

BRIEF DESCRIPTION OF THE DRAWING

These and other objects and attendant advantages of this invention will become more readily understood and apparent by reference to the following detailed description, of which the accompanying drawing forms an integral part. In the drawing:

FIG. 1 is a sectional view of the preferred embodiment of a tandem solid-hybrid rocket motor of this invention;

FIG. 2 is a block diagram of the oxidizer valve control system used in the rocket motor of FIG. 1;

FIG. 3 is a sectional view taken along line 3—3 of FIG. 1 (drawn to a smaller scale); and, FIG. 4 is a sectional view taken along line 4—4 of FIG. 1 (drawn to a smaller scale).

DESCRIPTION OF THE PREFERRED EMBODIMENT

Accurate missile range zoning may be provided by employing a rocket having a single-chamber motor containing both a hybrid fuel charge and a solid propellant charge. Referring now to FIG. 1, a rocket 10 includes a motor case 11 mounted therein in a conventional manner. Motor case 11 has a cylindrical chamber 15 therein with a solid propellant charge 14 in the aft end of chamber 15 and a hybrid fuel charge 12 in the forward end of chamber 15. An exhaust nozzle 18 is mounted at the aft end of motor case 11 in a conventional manner. A baffle gas mixer plate 16 is mounted in chamber 15 so as to separate charges 12 and 14. 18 holes are drilled in mixer plate 16 in a configuration illustrated in FIG. 4 with each hole containing an annular carbon insert 19 (to prevent erosion) having an orifice 41 therein. Orifices 41 are positioned "behind" the hybrid grain spokes to produce two turns of the gas path. Located adjacent to mixer plate 16 and mounted in a conventional manner in the internal perforation of solid propellant charge 14 is a conventional squib igniter 8 for igniting charge 14.

An oxidizer storage and control system is associated with hybrid fuel charge 12 and is housed in the forward end of rocket 10. This system includes a combination oxidizer injector and motor head (hereinafter referred to as injector head 26). As shown in FIG. 3, injector head 26 uses thirteen modified commercial spray nozzles to provide a uniform spray pattern. Nozzles 27 discharge each of 12 spaces between grain spokes and one nozzle 29 sprays down the center of charge 12. Full-cone spray patterns are used because smoother combustion is obtained than with hollow cone injectors. As shown in FIG. 1, a motor potentiometer pressure gauge 38 is in communication with chamber 15 via an inclined passageway 35 in injector head 26 (see FIG. 3) via a fitting 37 and a conduit 39.

The oxidizer storage and control system further includes a cavitating venturi 24, in communication with nozzles 27 and 29, for flow control and measurement. An explosively-actuated oxidizer balanced poppet valve 9 is actuated to an open position by squib 22 for communicating oxidizer to cavitating venturi 24 and by squib 23 for cutting off the flow of oxidizer to cavitating venturi 24. The location of cavitating venturi 24 near injector head 26 minimizes the line filling time after explosively actuated oxidizer valve 9 is opened. This gives more rapid motor response to the signal for hybrid motor ignition. A burst diaphragm 30 allows an oxidizer tank 28 (which tank defines an oxidizer chamber 21) to be handled and filled as a separate unit. A suitable liquid oxidizer is contained in oxidizer chamber 21. The oxidizer in chamber 21 is caused to burst diaphragm 30 by means of an expulsion device, in this case a piston 20. Piston 20 is pressurized by hot gases inside chamber 33. The hot gases are introduced into chamber 33 from a conventional hot gas generator 34 mounted in closure 32. A hot gas relief valve 36, illustrated only schematically, is used for regulating the maximum pressure to be maintained in chamber 33. Viton O-rings (not shown) are used throughout the piston expulsion system to provide seals where needed.

Referring to FIG. 2, the output of potentiometer pressure gauge 38 is integrated electronically by a pressure integrator 40 which connects a voltage source 42 with oxidizer valve 9 and fires it by squib 22 when a predetermined pressure-time integral is reached. This is easily accomplished by means of a capacitance circuit.

Before the actual operation of the tandem motor of FIG. 1 commences, hot gas generator 34 is pressurized and ready to go upon the opening of oxidizer valve 9.

In operation, squib igniter 8 is ignited by conventional means. Solid propellant charge 14 starts to burn and provides combustion gases which, for the most part, exit from rocket 10 through exhaust nozzle 18. A very small part of these gases flow toward the front of rocket 10, and the surface of hybrid propellant charge 12 is heated by radiation and convection. Thus, these solid propellant combustion gases heat the surface of hybrid charge 12 sufficiently to cause ignition with the liquid oxidizer when the liquid oxidizer is later injected into hybrid charge 12. The space evacuated by solid propellant charge 14 as it burns will later serve as a mixing chamber for more efficient hybrid fuel charge 12 combustion. Mixer plate 16 separating charges 12 and 14 provides additional mixing and will later further increase the combustion efficiency of hybrid fuel charge 12.

Hybrid fuel charge 12 has now been heated sufficiently to ignite upon injection of the liquid oxidizer. This occurs upon the opening of oxidizer valve 9 at a preset pressure-time integral. This is effected by the output of motor potentiometer pressure gauge 38, which is integrated electronically to open oxidizer valve 9 at the preset pressure-time integral (which is adjusted to compensate for any valve delay and injector filling delays).

Referring again to FIG. 2, the output of motor potentiometer pressure gauge 38 is integrated electronically by a pressure integrator 40 which connects a voltage source 42 with oxidizer valve 9 and fires it by squib means (not shown) when the preset pressure-time integral is reached. This is accomplished by means of a capacitance circuit. When oxidizer valve 9 is thus opened, liquid oxidizer from chamber 21 is expelled by piston 20 from chamber 21 and bursts burst diaphragm 30. The oxidizer is fed through oxidizing valve 9 and cavitating venturi 24 through nozzles 27 and 29 in injector head 26 into the previously heated hybrid fuel charge 12. Charge 12 is ignited upon contact with the oxidizer, and the hybrid combustion products flow through holes 41 in mixer plate 16, through the space previously evacuated by solid propellant charge 14, and out exhaust nozzle 18.

The piston expulsion system pressure has been set (before actual operation of the tandem motor) at 1,200 p.s.i. to allow for pressure drops of 240 p.s.i. for cavitating venturi 24, 100 p.s.i. for oxidizer valve 9 and line losses and 50 p.s.i. for injector head 26. The maximum pressure in chamber 15 is 800 p.s.i.a. In order to have constant thrust for both phases of burning, the solid booster chamber pressure is also designed for 800 p.s.i.a.

The hybrid motor thrust is terminated either by the automatic closing of oxidizer valve 9 by squib 23 (at a preset dialing of a conventional structure which is not shown) or by the complete expenditure of the oxidizer. This feature provides the missile zoning desired. If desired, a variable control valve (rather than an on-off oxidizer valve 9 and oxidizer) may be employed to give thrust modulation.

Solid propellant charge 14 provides the minimum impulse of rocket 10 and the minimum missile range.

Testing of this invention has demonstrated that a tandem solid-hybrid rocket motor can be used to meet a specific need using present technology. The tandem solid-hybrid rocket motor of this invention incorporates a unique combustion chamber arrangement which minimizes the hybrid mixer requirement.

Various other modifications and variations of this invention will become readily apparent to those skilled in the art in the light of the above teachings, which modifications and variations are within the spirit and scope of this invention.

I claim:
1. A rocket motor comprising:
a motor case defining a combustion chamber therein;

a solid propellant charge at the aft end of said combustion chamber;
a solid hybrid fuel charge at the forward end of said combustion chamber, said solid propellant charge and said solid hybrid fuel charge being juxtaposed in tandem;
an oxidizer in fluid communication with said solid hybrid fuel charge;
means for controlling the flow of said oxidizer to said solid hybrid fuel charge;
a perforated gas mixer baffle plate located intermediate adjacent ends of said solid propellant charge and said solid hybrid fuel charge to separate said solid propellant charge from said solid hybrid fuel charge and provide additional mixing of exhaust gases from combustion of said solid hybrid fuel charge as the exhaust gases pass through said perforated baffle plate to thereby further increase the combustion efficiency of said solid hybrid fuel charge with said oxidizer;
and means for igniting said solid propellant charge.

2. The rocket motor as set forth in claim 1 wherein said gas mixer baffle plate comprises annular carbon inserts located in holes therein, said carbon inserts defining orifices therein.

3. The rocket motor as set forth in claim 1 wherein said means for controlling the flow of said oxidizer to said hybrid fuel charge comprise pressure-time integral means for timing said flow of said oxidizer to said hybrid fuel charge.

4. The rocket motor as set forth in claim 1 wherein said hybrid fuel charge is in the form of a wagonwheel configuration defining hybrid grain spokes, and wherein injector means for injecting said oxidizer are positioned for injecting said oxidizer down the center of said wagonwheel and intermediate said grain spokes.

5. The rocket motor as set forth in claim 4 wherein said orifices in said gas mixer baffle plate are in alignment with said hybrid grain spokes.

6. The rocket motor as set forth in claim 5 wherein said orifices are positioned in said gas mixer baffle plate with even-numbered ones of said spokes having one orifice in alignment therewith, and odd-numbered ones of said spokes having two orifices in alignment therewith.

7. The rocket motor as set forth in claim 6 wherein said spokes number twelve.

8. The rocket motor as set forth in claim 4 wherein said means for controlling the flow of said oxidizer to said hybrid fuel further includes an explosively actuated oxidizer inlet valve located in fluid communication intermediate said oxidizer and said injector means.

9. The rocket motor as set forth in claim 8 wherein a cavitating venturi is located in fluid communication intermediate said inlet valve and said injector means, said cavitating venturi being located near said injector head.

* * * * *